Inventor
Sam H. Kaplan

By Francis W. Crotty
Attorney

United States Patent Office 3,681,111
Patented Aug. 1, 1972

3,681,111
MANUFACTURE OF A COLOR PICTURE TUBE
Sam H. Kaplan, Chicago, Ill., assignor to Zenith
Radio Corporation, Chicago, Ill.
Filed Aug. 24, 1970, Ser. No. 66,456
Int. Cl. H01j 31/20
U.S. Cl. 117—33.5 CM     4 Claims

ABSTRACT OF THE DISCLOSURE

The mosaic image screen of a shadow mask color tube has a plurality of interlaced sets of elemental screen areas, each of which areas includes a phosphor of a particular color and a filter which is transmissive of that color but, otherwise, is essentially a visible light attenuator. The filters of at least one of these interlaced sets of elemental screen areas are formed of discrete spheres of a glass that preferably has a low index of reflection and a fusion or softening temperature so high in relation to the processing temperatures of the tube that the spheres do not become fused to the faceplate of the tube.

CROSS REFERENCES TO RELATED APPLICATIONS

The subject invention is related to and is a further development of the screening processes described and claimed in the following copending applications all of which are assigned to the assignee of the present invention: Ser. No. 830,288, filed June 4, 1969 in the name of Howard G. Lange, now Pat. No. 3,569,761; Ser. No. 66,457 filed in the name of Ronald C. Robinder; Ser. No. 66,455 filed in the name of Irwin Kachel; and Ser. No. 66,454 filed in the name of Ghulam Khan. The last three applications are filed concurrently herewith.

BACKGROUND OF THE INVENTION

The present invention is addressed to an improvement in the manufacture of a color cathode ray tube with particular reference to the processing of its image screen.

The screen of a color picture tube has deposits of different phosphor materials which, in response to excitation by impacting electrons emit light of wavelengths corresponding to the primary colors green, blue and red. These phosphors are deposited on a multiplicity of elemental screen areas arranged in three sets that are interlaced with one another in a recurring pattern over the image screen area. The elemental screen areas may have any of a variety of configurations but usually take the form of dots or stripes. While the processing technique of this invention is useful irrespective of the specifics of the elemental screen area shape, it is convenient to give particular attention to a shadow mask picture tube for which the screen is of the mosaic type, being composed of phosphor dot triads with each such triad consisting of a dot of green, a dot of blue and a dot of red phosphor material. The field over which these triads are applied constitutes the image reproducing area of the screen and it too may have different configurations, such as round or rectangular. The rectangular field is the more popular and will be assumed for the screens discussed herein.

Very distinct advantages in contrast, brightness and colorimetric values may be imparted to such screen structures by practicing the invention of applicant's earlier Pat. 3,114,065 issued on Dec. 10, 1963. An outstanding characteristic of the elemental screen areas of a color tube embodying the teachings of that patent is that each such area comprises a phosphor deposit for emitting light of one of the primary colors and also a filter that is highly transmissive to the light emitted by its associated phosphor but is substantially nontransmissive to the remaining primary colors.

The screen concept of the earlier Kaplan patent is extended in the teaching of the aforesaid Lange application to the manufacture of what has become known as a black-surround screen type of color tube. Such a screen is described and claimed in Pat. 3,146,368, issued on Aug. 24, 1964 in the name of Joseph Fiore et al. and assigned to the assignee of the present invention. The black-surround screen structure differs from conventional tri-color picture tube screens in two important aspects. The phosphor dots are of reduced size and are separated from one another, wherein in conventional color tube structures the phosphor dots, being larger, are in tangential contact. The other difference is that light-absorbing material fills the spaces which separate the phosphor dots and, if graphite is used as the filler, each dot of the screen is accompanied by a black-surround.

The Lange application achieves simplification in screening black-surround tubes. It makes possible the development of light-emitting areas or effective phosphor dots of smaller diameter than the apertures of the color selection electrode or shadow mask associated with the screen and through which color selection is accomplished in well-known manner. The simplification achieved, by utilization of the Lange concept, is forming the black-surround screen through photographic printing techniques in which the shadow mask serves as a pattern and in which it is not necessary to modify the whole size of the mask either before or after screening.

More specifically, in practicing the Lange invention, a first set of filter elements, such as green filters, are applied to the screen by photographic printing through the shadow mask in which the individual filter elements are precisely positioned over the elemental screen areas assigned to green and are precisely dimensioned by the apertures or holes of the mask. In fact, each filter has a diameter such that it covers not only an elemental light emitting green area of the screen but also extends to the periphery of the neighboring elemental light-emitting areas that are devoted to others of the primary colors. By developing three sets of such filters, of the same size and interlaced over the whole image area, the interlaced filter elements overlap in their peripheral or edge portions. More particularly, their overlap occurs in those parts of the screen that otherwise separate the multiplicity of elemental light emitting areas. Where two such filter elements overlap, there is very little transmission to visible light and accordingly the overlap portions of the color filters contribute the function of the black-surround described in the Fiore et al. patent. With the filters deposited in the described fashion, phosphors are applied over them in proper colorimetric association, that is to say, green phosphors over green filter elements, blue phosphors over blue filter elements and red phosphors over red elements.

The Kachel, Khan and Robinder applications represent further developments of the simplified Lange screening process. They feature the use of what are known as commercial lusters in forming the filter component desired in each elemental screen area. As a general proposition and as discussed in the Robinder application, a metallic luster is a metal resinate which is the reaction product of a metal compound or oxide as a base neutralized, for example, with an organic resinic acid. They have the property that, upon being heated to a predetermined firing temperature, the organic ingredient volatilizes and develops, as a residue, an inorganic colorant. Expressed in other words a commercial luster may be described as an inorganic oxide colorant in a vehicle of organic character which disappears upon firing. When a thin film or layer of such a compound is applied to glass or to a ceramic substrate and heated to the firing temperature, the deposited colorant imparts an iridescent appearance to the substrate and the color is controlled by choice of the metallic ingredient or oxide. For the most part, commercially available lusters are insoluble in water and would appear, therefore, not to lend themselves to water-based systems of screening such as popularly employed in the mass production of color picture tubes. The Robinder application teaches how such lusters may nevertheless be advantageously employed in screening color tubes of the type under consideration. The Kachel and Khan applications further develop the use of lusters and teach how water-based lusters may be formulated and even how commercially available lusters that are insoluble in water, may be processed successfully in water-based slurry screening systems and, for example, those which employ water-based photosensitive resists.

In the present state of the art of commercial lusters, some difficulty is experienced in attaining precise colorimetric values of the filter components developed through screening with lusters. This becomes more perplexing to the tube manufacturer because luster formulations are very often matters of trade secrets, rendering it difficult for the tube manufacturer to optimize the luster formulations for color tube screening. Experiments to date yield especially good red filter elements derived from commercial lusters and reasonably good blue filters, but as of the present time, not totally satisfactory green filters. Accordingly, an object of the present invention is to improve the manufacture of screens of the type under consideration especially with respect to the formation of the sets of elemental image areas of the screen particularly devoted to blue and green.

An approach to that objective is certainly taught in the Kaplan patent wherein the elemental filter components are formed by the use of frits. A frit, suitably colored to provide the desired color filter response, is powdered and applied to the screen and then subjected to a heat treatment in which the frit is fused to the glass faceplate of the image screen. Here again, while the concept is perfectly valid, commercially available frits do not provide optimum results. It is found, for example, that a great many frits are unsuited to tube making because their softening temperature is too high to be compatible and frits having the necessary low melting or fusion temperature required for this application may have relatively poor chemical stability and their is a tendency of undesired interaction with the phosphors. Moreover, unfused frits generally are angular structures and present an undesirably large amount of reflecting surface, so much so that the frit tends to become opaque and then, of course, loses its filter properties unless fused and flowed to a continuous film.

It is therefore a particular object of the invention to improve screening of a color picture tube of the type wherein each elemental area of the screen comprises a deposit of phosphor material as well as a filter component selective to the wavelength of light emitted by its associated phosphor.

The invention is especially suited to the preparation of black-surround screens and will be described in that connection although it clearly is of broader application. For example, the invention is equally useful in the preparation of conventional color tube screens, conventional in the sense that the phosphor dots are sized to be in tangential contact with one another.

SUMMARY OF THE INVENTION

The process of the invention improves the manufacture of a color cathode ray tube having an image screen deposited on a glass substrate and comprised of a plurality of interlaced sets of elemental screen areas, which areas individually include a phosphor material of particulate form for emitting light of one of the primary colors and further include a light filter predominantly transmissive to light emitted by its associated phosphor material but substantially nontransmissive to the remaining two primary colors. In achieving the improvement realized with the invention, the light filter of the individual elemental screen areas, constituting at least one of the aforesaid interlaced sets, is formed of a substantially monolayer of discrete spheres of a glass preferably having a low index of reflection and having a fusion or softening temperature so high in relation to any processing temperature of the substrate in the manufacture of the tube that the spheres do not fuse to the substrate or to each other. The spheres may have a mean diameter which is relatively large compared with the mean particle size of the associated phosphor material but is small compared with the smallest dimension of the elemental screen areas to which the spheres are applied.

In another aspect of the invention, one or more of the interlaced sets of elemental screen areas has filter elements formed of discrete glass spheres as described in the preceding paragraph while the remaining set or sets of elemental screen areas has filter components formed, preferably by photographic screening, with commercial lusters of appropriate colorimetric properties.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which

DESCRIPTION OF PREFERRED EMBODIMENTS

Color tubes have two envelope sections initially separated from one another to facilitate screening. One of these sections is a cap which comprises the screen or image area with a circumscribing flange. The other section is conical and is configured as well as dimensioned at its large end to match the flange of the cap or faceplate section so that the two sections may be united through frit sealing. The smaller end of the conical section terminates in a neck which houses an assembly or cluster of three electron guns. The tube structure, apart from its screen and the method of making that screen, may be entirely conventional and need not be considered further.

Figure 1:
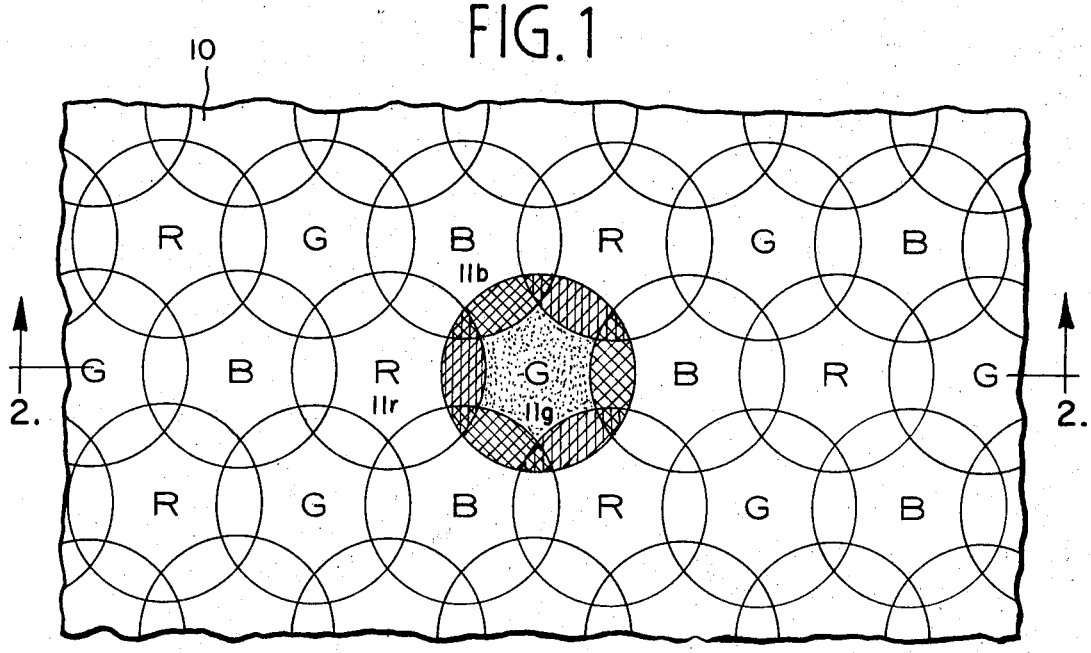
FIGS. 1 and 2 depict a prior art screen structure which may be beneficially fabricated by the process of the subject invention.
Figure 2:
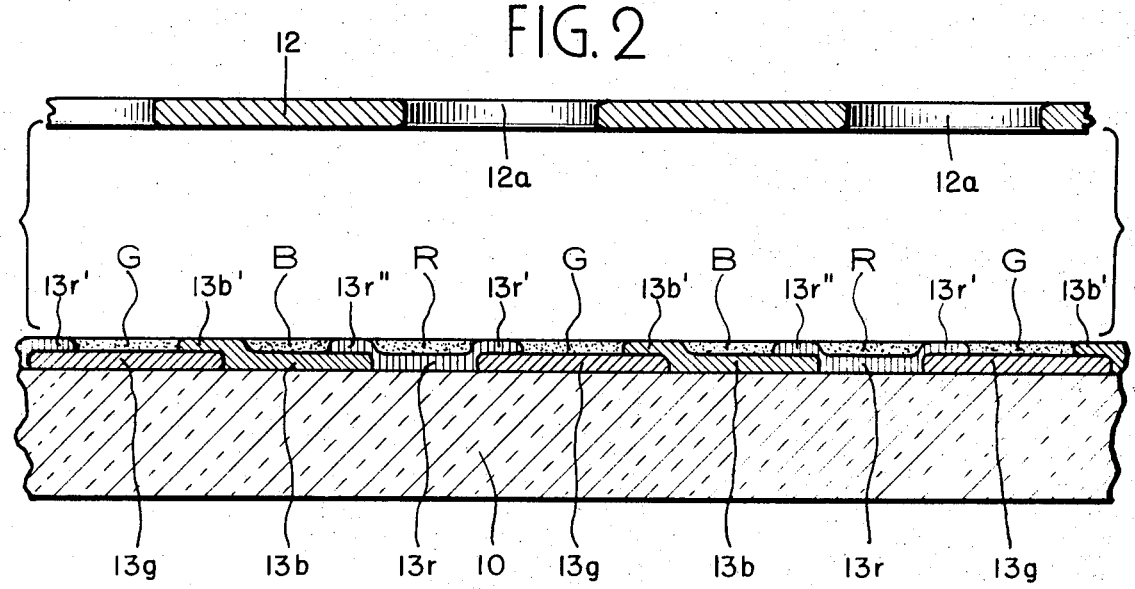

FIGS. 1 and 2 show a fragment of the screen structure described and claimed in the Lange application. It has a glass substrate 10 that is substantially transmissive of all light wavelengths in the visible spectrum and is the image area or faceplate of the tube. It may be 100% transmissive to visible light or may have some filtering attributes to enhance contrast by having a transmissivity for visible light of perhaps 90% or less. There is nothing unique in the structure of the faceplate since the industry is well versed in the art of preparing the screen substrate with any desired percent transmissivity.

The screen is comprised of a plurality of interlaced sets of elemental screen areas, which areas individually include a phosphor material of particulate form for emitting light of one of the three primary colors in response to electron excitation and further include a light filter component which is predominantly transmissive to the wave length of light emitted by its associated phosphor but is substantially nontransmissive to the remaining two primary colors. The individual elemental screen areas are represented by circles and the legends G, B and R represent their color designations green, blue and red, respectively. Being interlaced as illustrated in FIG. 1, collectively they define phosphor dot triads over the entirety of the image screen. One such triad is designated 11g, 11b and 11r. Representative light emitting element 11g is a cusp shaped centrally located area enclosed by cross-hatching, the significance of which will be described presently. The cusp shaped area is a light emitting area of the screen and defines the liimts of the effective phosphor deposit of its particular image element. It may be considered to be approximately dot shaped; its specific configuration is a consequence of forming the interlaced sets of elemental image areas by photographic printing through the apertures of the shadow mask characteristically included in a tube of the type under consideration for achieving color selection. Printing through the mask both positions and dimensions the image elements relative to one another.

It will be noted that the light emitting element or effective phosphor area of representative image element 11g is smaller in dimension than the hole 12a of the shadow mask 12, a portion of which is shown in FIG. 2 and through which screen printing takes place. In order to avoid unnecessary confusion to FIG. 1, the mask representation has been omitted from that view. When the shadow mask is properly installed in position in relation to substrate 10, each mask hole 12a is in alignment with an assigned phosphor dot triad of the screen. This registration of mask holes with phosphor dot triads is well understood in the art and makes possible color selection by reason of the fact that electron beams passing through such holes respectively impact only an assigned one of the three interlaced sets of elemental image areas.

One characteristic of the preferred form of black-surround screen is that the effective area of the elemental phosphor deposit is smaller than the area of the holes in the mask. The expression "effective area of the elemental phosphor deposit" is used to mean that portion of the phosphor deposit that overlies a light emitting area of the screen and contributes to image reproduction. If any portion of the phosphor deposit overlies a visible light attenuator, it is ineffective in image synthesizing and may be ignored. Another characteristic of the black-surround screen is the presence of a light attenuator surrounding each of the effective elemental phosphor deposits, and such an attenuator is indicated by the cross-hatching in FIG. 1 surrounding element 11g. While cross-hatching has been utilized with respect to this single element simply for purpose of emphasis, it will be understood that all elemental image areas of the screen are similarly provided with a visible light attenuator. The attenuator comprises overlapping filter components which individually have a relatively high transmission efficiency for light of only an assigned one of the primary colors, and a relatively low transmission efficiency for light in the remainder of the visible spectrum. Ideally the filter components which overlap to form the desired light attenuator can be confined simply to the portion of the substrate shown in cross-hatching of FIG. 1 but process simplicity with a performance gain is achieved by including filter components in each elemental image area but extending from its assigned light emitting area over the portion of the substrate separating that area from its neighbors to constitute in this fashion one component of the overlapping filters of the attenuator. This is most clearly represented in FIG. 2 where the filter component of the green elemental image area 11g is designated 13g. It is applied directly over substrate 10 and the green phosphor G is, in turn, coated over its associated filter 13g. The diameter of filter component 13g exceeds the maximum dimension of the effective phosphor deposit G and therefore extends beyond the area of light emitting element 11g.

There is also shown in FIG. 2 a blue filter component 13b assumed to have been applied to substrate 10 subsequent to the formation of the set of green filter components 13g. Consequently, its edge portion 13b' is in overlapping relation to the edge portion of green filter components 13g. Similarly, the red filter component 13r has a peripheral portion 13r' that extends over the contiguous portion of green filter components 13g. Assuming the red filter to have been the last of the three to be applied, it will have another peripheral portion 13r'' in overlapping relation to a portion of the blue filter components 13b. These several overlapping peripheral portions of the three sets of filter components are designated by the cross-hatching in FIG. 1. If the filters are properly related colorimetrically, any portion of substrate 10 where two or more such filters overlap is essentially black, that is to say, has an exceedingly low transmission efficiency of 10–20 percent or less for all wavelengths in the visible spectrum. This is aided by the fact that ambient light striking the finished tube, makes a double pass through these filter elements, being reflected by the aluminum layer that backs the screen and then going back to the observer again through the filter elements.

The discussion of FIG. 2 pointed out that the interlaced filter patterns developed cusp shaped light emitting areas or elements, such as that designated 11g. Each such area has a color filter appropriate to the color phosphor to be deposited in the particular area. For example, the phosphor deposit G of FIG. 2 is shown as confined to the light emitting area of the faceplate that is covered solely by filter 13g and is excluded from the light attenuator comprised of the overlapping filter portions encircling light emitting area 11g. This is an idealized representation and a simplification of the drawing. As a matter of practice, if the phosphor G is applied by the same photo printing technique employed in developing the filter components, the phosphor dot will be essentially the same in diameter as its associated filter component. However, phosphor superposed over peripheral portions of the filter elements which overlap to serve as the light attenuator makes no significant contribution to image reproduction and, accordingly, has not been shown in the drawing.

The process improvement of the subject invention concerns most particularly the formation of the three series of color filter elements 13g, 13b and 13r. They are formed, in practicing the invention, of a substantially monolayer of discrete spheres of glass having a low index of reflection and having a fusion temperature so high in relation to any processing temperature of the glass faceplate encountered in the manufacture of the tube that the spheres do not fuse to one another or to substrate. In this respect, the subject invention is distinctly different from the prior practice of developing filter elements by the use of fusible frits described in the Kaplan patent. The discrete glass spheres have the advantage of minimal surface area since a sphere presents the smallest surface area for a given volume of any solid figure.

Consequently, the filter composed of glass spheres is less reflective than those constructed of unfused frit, which, as stated above, is an angular rather than a spherical structure and approaches the low reflectivity of a fused frit or other optically thin layer. The spheres have a mean diameter that is large compared to the mean particle size of the phosphor material but very small compared with the smallest dimension of the elemental screen area to which the spheres are applied. Typically, the mean size of phosphor particles is 3 to 10 microns while the glass spheres are in the range of 15 to 30 microns. Accordingly, the spheres are relatively large compared to the phosphor particles although they are just a small fraction of the diameter of the phosphor dot which usually is of the order of 15 mils.

In applying the glass spheres one has the election of establishing the filter layer first and the superposing a deposit of phosphor or, the spheres and phosphor may be applied together in perhaps a settling procedure by which the larger sized spheres settle out and are deposited before the smaller phosphor particles. It is particularly convenient to apply to substrate 10 a photosensitive slurry, such as polyvinyl alcohol (PVA) sensitized with ammonium dichromate. After such a slurry layer has been applied, it is exposed in the customary way by actinic energy, such as ultraviolet light, directed through the holes of mask 12 to the slurry layer. Assuming that the green filter is the first to be developed, the source of exposing light is positioned to simulate the electron gun of the tube that is assigned to energize green phosphor. The exposure establishes in the slurry a latent image of the pattern desired for the green filter components and this pattern is developed by washing the faceplate with water since PVA is water soluble. While the developed pattern is still tacky, the glass spheres are applied by a known technique such as high velocity dusting. That is to say, the spheres are blown onto the tacky deposits of slurry after which the faceplate is dried and again washed to remove the glass spheres that are not embedded in and held by the resinous deposits. In this fashion an essentially monolayer of beads or glass spheres is applied to the slurry deposits and constitute a set of green filter components. In similar fashion, but with appropriate selection as to the color of the beads and the location of the light source, the blue and red filter components may also form.

Dusting of the beads on slurry deposits that are soft and therefore receptive is a very practical process by which the beads may be deposited in place. They may also be applied by being included as ingredients of the slurry coating although it is necessary to exercise precaution in the choice of excitation light source because of the fact that the beads are visible light filters. For example, blue colored beads could be included in the slurry since they are transmissive of ultraviolet light whereas beads of other colors have a tendency to absorb ultraviolet light which would make their application as an ingredient of the slurry difficult. However, if the PVA is sensitized to the wavelength of light transmitted by particular beads included as an ingredient in the slurry, it becomes feasible to use a slurry as a vehicle for such beads.

In any event, the three interlaced sets of green, blue and red filters are applied, preferably with the described dusting process, to establish the family of overlapping filters described above with respect to FIG. 2. Thereafter, the phosphor materials are deposited in the proper relation to the filters, that is to say, each phosphor is applied over the filter which is predominantly transmissive of the light emitted when that particular phosphor is energized.

Glass beads are generally formed of soda-lime glass and are commercially available in a variety of colors and a variety of sizes. Inorganic colorants establish the desired color filter characteristics. By way of illustration, cobalt oxide may be used as a colorant for blue filter beads, copper oxide or chromium oxide may be used for green and cadium sulpho-selenide for red. Since the glass beads are affixed to the glass substrate, in essentially the same manner as the phosphor particles, and in contradistinction of the use of glass frits, and are not fused to the substrate, they afford greater flexibility in the choice of materials that may be used. For example, glass that has a high softening temperature, much higher than any temperature encountered in the various processing steps of manufacturing color tubes, can be used to advantage because the beads are not fused to the substrate of the screen in process and such beads exhibit greater stability particularly with respect to colorants and freedom from contamination of the phosphors.

Certainly it is not necessary to form each of the three interlaced sets of filters with suitably colored beads. In the present state of the art, excellent beads are commercially available for developing both the green and the blue series of filter components. These are available from Flex-O-Lite Corporation, St. Louis, Mo. If the green and blue filters are formed of beads, it is very practical to utilize commercial lusters in developing the series of red filter components. The direct emulsification of commercial lusters as described in the Khan application is a convenient method of forming red filter elements. By way of example, to 50 cc. of a luster solution (type A–2000 distributed by the Liquid Gold Division of Englehart Industries of East Newark, N.J.) is added 4 cc. of an emulsifying agent (such as Alipol CO 436 distributed by GAF Corporation, New York, N.Y.). This is thoroughly intermixed ultrasonically for about five minutes and then 150 cc. of water is gradually added as the mixing continues. After the mixing has been completed 350 cc. of 10% PVA is added followed by 400 cc. of water. This is a suitable formulation for a slurry including a red luster. It is applied by photographic screen to the proper elemental image areas of the faceplate, namely, those which are assigned to red. Upon heating the faceplate to a firing temperature of about 400° C., the colorant which is deposited forms the desired red filter components. Firing may take place as soon as exposure and developing has been accomplished or it may be deferred to occur during bake-out of the screen.

While there has been described a particular embodiment of the invention, it will be obvious to those skilled in the art that changes and modifications may be made without departing from the invention in its broad aspects and, therefore, the aim in the appended claims is to cover all such changes and modifications as fall within the true spirit and scope of the invention.

I claim:

1. In the manufacture of a color cathode ray tube having an image screen deposited on a glass substrate and comprised of a plurality of interlaced sets of elemental screen areas, which areas individually include a phosphor material of particulate form for emitting light of one of the three primary colors and a light filter predominantly transmissive to light emitted by its associated phosphor material but substantially nontransmissive to the remaining two primary colors, the improvement which comprises:

forming the light filter of the individual elemental screen areas, constituting at least one of said interlaced sets, of a substantially monolayer of discrete spheres of a glass having a low index of reflection and having a fushion temperature so high in relation to any processing temperature of said substrate in the manufacture of said tube that said spheres do not fuse to said substrate, and said spheres having a means diameter that a large compared with the mean particle size of its associated phosphor material but is small compared with the smallest dimension of the elemental screen areas to which said spheres are applied.

2. The improvement in the manufacture of a color cathode ray tube, in accordance with claim 1, in which
said elemental screen areas have a dot configuration with a diameter of approximately 15 mils,
in which said phosphor material has a particle size of about 2–6 microns,
and in which said glass spheres have a diameter in the range of 15–20 microns.

3. The improvement in the manufacture of a color cathode-ray tube, in accordance with claim 1, in which,
the light filter of the individual elemental screen areas, constituting another one of said interlaced sets, is formed of an organic metallic compound which upon being heated to the bake-out temperature of said tube is converted into an inorganic colorant that is predominantly transmissive to the color of light emitted by the phosphor material of the elemental screen areas of said other set.

4. The improvement in the manufacture of a color cathode-ray tube, in accordance with claim 3, in which, the light emitted by the phosphor material of said one set of elemental screen areas is green or blue and the light emitted by the phosphor material of said other set of a elemental screen areas is red.

References Cited

UNITED STATES PATENTS 3,569,761    3/1971    Lange _____ 96—36.1 X

ALFRED L. LEAVITT, Primary Examiner

W. F. CYRON, Assistant Examiner

U.S. Cl. X.R.

96—36.1